United States Patent [19]

Rao

[11] 4,056,885

[45] Nov. 8, 1977

[54] METHOD OF PREPARING LITHIUM-ALUMINUM ALLOY ELECTRODES

[75] Inventor: Bhaskara M. L. Rao, Fanwood, N.J.

[73] Assignee: Exxon Research & Engineering Co., Linden, N.J.

[21] Appl. No.: 750,965

[22] Filed: Dec. 15, 1976

[51] Int. Cl.² .............................................. H01M 4/04
[52] U.S. Cl. .................................... 29/623.1; 429/218
[58] Field of Search ............................ 29/623.1, 623.5; 429/218, 241; 141/1.1

[56] References Cited

U.S. PATENT DOCUMENTS

| | | | |
|---|---|---|---|
| 3,607,413 | 9/1971 | Buzzelli | 429/218 X |
| 3,981,743 | 9/1976 | Schaefer | 429/218 |
| 4,002,492 | 1/1977 | Rao | 429/218 X |

*Primary Examiner*—Carl E. Hall
*Attorney, Agent, or Firm*—Joseph J. Dvorak

[57] ABSTRACT

A lithium-aluminum alloy electrode having from about 10% to 95% by weight of lithium is formed by contacting a preformed lithium-aluminum laminate with a solution of a lithium salt in an organic solvent. Preferably the laminate is supported on a wire mesh support structure.

13 Claims, 3 Drawing Figures

METHOD OF PREPARING LITHIUM-ALUMINUM ALLOY ELECTRODES

BACKGROUND OF THE INVENTION

1. Field of the Invention

This invention relates to a method for preparing a lithium-aluminum alloy electrode for use in electrochemical cells incorporating such electrodes.

2. Description of the Prior Art

Lithium-aluminum alloys have been suggested as negative electrodes for electrochemical cells because of the highly electronegative nature of the lithium and the low atomic weight of the lithium-aluminum alloy. The combination of high electronegativity plus low atomic weight makes possible the construction of high energy density cells.

Several techniques are known for fabricating lithium-aluminum alloys for use as electrode materials.

One prior art technique for forming a lithium-aluminum electrode involves the electrochemical deposition of lithium onto a substantially pure aluminum electrode from a molten lithium salt bath. An example of such a process is set forth in U.S. Pat. No. 3,607,413.

Another technique for preparing lithium-aluminum alloys involves common metallurgical practices such as melting appropriate proportions of lithium and aluminum in an inert atmosphere and thereafter comminuting the cooled lithium-aluminum alloy so as to produce a finely divided powder. As an example of this technique see U.S. Pat. No. 3,957,532.

In yet another technique, a sandwich structure of lithium and aluminum sheets are heat soaked at temperatures close to the melting point of lithium while simultaneously applying pressure to the sandwich structure. See, for example, U.S. Pat. No. 3,981,743.

Each of the foregoing general techniques has some limitations and problems associated with it. In addition thereto, all of the above-mentioned techniques suffer from the disadvantage that considerable energy input is required in the formation of the alloy, in the form of thermal energy, electrical energy or both. Thus, there remains a need for a simple procedure for forming lithium-aluminum alloy electrodes which can be achieved at lower energy input.

SUMMARY OF THE INVENTION

In its simplest sense, the present invention relates to an improved technique for forming a lithium-aluminum alloy electrode by first forming a laminate from sheets of lithium and aluminum and thereafter contacting the laminate with a solution of a lithium salt dissolved in an organic solvent. The relative proportion of lithium and aluminum sheet material employed in the formation of the laminate will, of course, depend upon the portion of lithium and aluminum desired in the resulting alloy, although it is particularly preferred that in forming the laminate, the lithium will be used in amounts ranging between about 20 weight % and 80 weight %, the balance being essentially aluminum.

DETAILED DESCRIPTION

Figure 1:
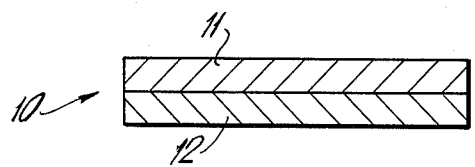
FIG. 1 is an enlarged cross-section of a laminate of lithium and aluminum sheet materials employed in the fabrication of the lithium-aluminum alloys in accordance with the present invention.

Referring now to FIG. 1 of the drawings, a lithium-aluminum alloy electrode is prepared by first forming a laminate 10 having one ply of aluminum sheet material 11 and one ply of lithium sheet material 12. Advantageously, the lithium and aluminum sheet material are pressed together using hand pressure with or without the aid of a roller, or optionally by passing the sheets of material through the nip of a double roll mechanism. In any event, the amount of pressure exerted is not at all critical and merely sufficient pressure to assure contact between the two sheet materials will suffice.

Figure 2:
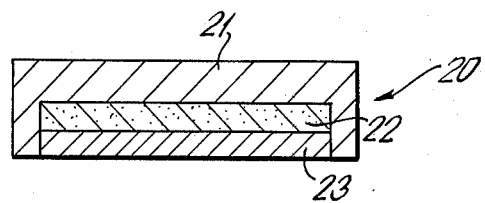
FIG. 2 is an enlarged cross-section of a laminate of lithium and aluminum sheet materials in which the aluminum sheet material encloses the lithium sheet material.

In an alternate embodiment shown in FIG. 2, a lithium-aluminum laminate 20 is formed from three sheets of material, two of which are aluminum and the third is lithium. In the embodiment shown in FIG. 2, the bottom sheet 23 of aluminum has the same dimensions as the core sheet 22 of lithium. However, top sheet 21 of aluminum is of larger dimensions, so as to completely encase the lithium sheet 22 as a central core when sheet 21 is pressed around sheet 22.

Figure 3:
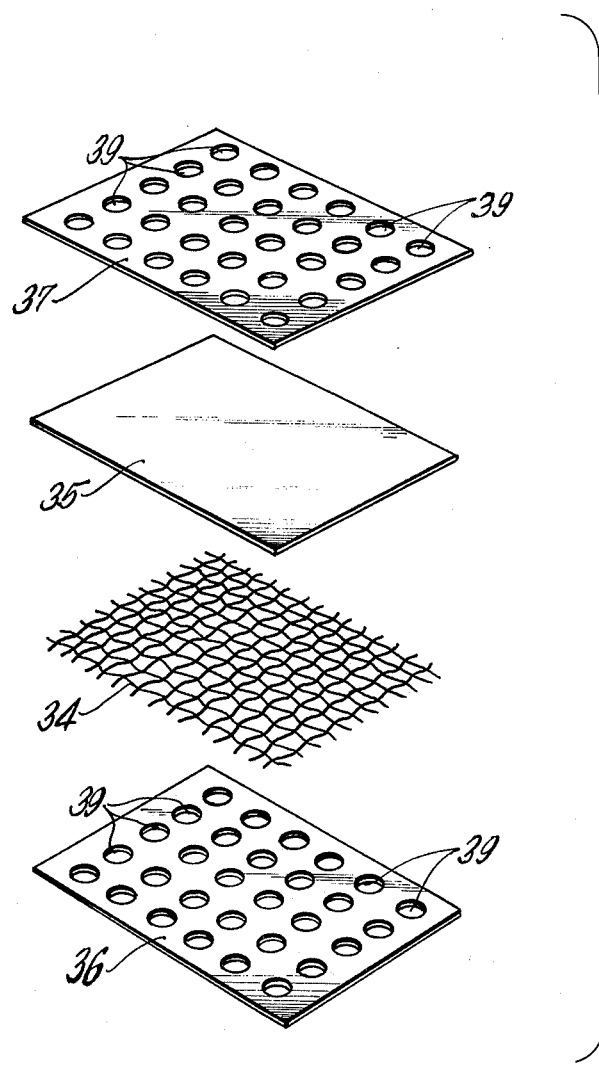
FIG. 3 is an isometric drawing illustrating the preferred technique of preparing a lithium-aluminum alloy in accordance with the invention.

In yet another and particularly preferred embodiment of the present invention, the laminated structure is formed from four sheet materials. As can be seen in FIG. 3, these comprise an open support structure 34, lithium foil 35, and top and bottom aluminum foil 36 and 37, respectively. The open structure 34 preferably is metal mesh or screen, such as an iron screen. Other materials such as nickel, copper, and stainless steel, with or without electroplated coatings on them, may be used for the support structure 34. Conveniently, the lithium foil sheet material 35 can be pressed onto and embedded into support 34. Thereafter, aluminum foil 36 and 37 are pressed so as to cover both sides of the lithium foil 35 embedded in support structure 34.

It should be noted that in the FIG. 3 embodiment, the aluminum foil 36 and 37 are shown as having perforations 39. This is particularly desirable in order to insure formation of the alloy in practical time periods. Indeed, when lithium is used as the central core material such that it completely is surrounded by aluminum, as is shown in FIG. 2, it is essential that the aluminum foil be perforated. The size of the perforations are not critical, so long as they are sufficiently large to permit the lithium ion containing solution hereinafter described to come into contact with the lithium and the aluminum.

The relative amounts of lithium and aluminum sheet material used will depend upon the composition of the lithium-aluminum alloy electrode being prepared. The relative proportions of lithium and aluminum may range, for example, from as low as 10 weight % lithium to as much as about 95 weight % lithium, the balance being aluminum. However, lithium-aluminum weight ratios generally between about 20 weight % and about 80 weight % are very desirable and indeed it is especially preferred to use in the range of about 20 weight % to about 80 weight % of lithium, the balance of aluminum, in the formation of laminate sheet material.

After forming a laminate from the lithium and aluminum, the laminate is then contacted with a solution of a lithium salt dissolved in a nonaqueous organic solvent. Examples of nonaqueous organic solvents that can be used in the formation of a lithium-aluminum alloy electrode include dioxolane, tetrahydrofuran, dimethoxy ethane and propylene carbonate, to mention a few. Dioxolane has been found to be a particularly preferred solvent.

As indicated, the organic solvent contains a dissolved lithium salt. Advantageously those lithium salts that display the highest solubility in the particular organic solvent are used. Examples of useful lithium salts include lithium perchlorate, lithium hexafluorophosphate, lithium tetrafluoroborate, lithium aluminum tetrachloride and lithium thiocyanate. Lithium perchlorate is particularly preferred.

The concentration of salt in the organic solvent will range generally from about 1 to 3 molar. However, it is particularly preferred that the salt solution be in the range of 2.5 to 3 molar.

While not wishing to be bound by any theory, it appears that when lithium is in contact with aluminum in a nonaqueous solution containing lithium ions, corrosion of lithium occurs leading to the formation of lithium-aluminum alloy.

In general, alloy formation occurs at ambient temperatures. Consequently, the aluminum and lithium laminate is contacted with an organic solution of a lithium salt for a time sufficient for the laminate to be converted into a lithium aluminum alloy, such contacting being made in the form of a half-cell and/or part of a galvanic cell. In the latter case, in situ formation of the alloy occurs.

The process of alloy formation may take anywhere from several hours to greater than 24 hours depending on the areas of contact of lithium-aluminum-electrolyte interface, and also depending upon the composition of the alloy desired. The area of contact will, of course, depend on the porosity and pore size distribution of the perforation in the aluminum foil. It is preferred that the perforations in the aluminum foil provide an open area which is greater than about 35% of the total area of the foil sheet as determined from the length and width of the sheet, for example. Typically the perforations in the aluminum sheet will provide an open area less than about 75% of the total area of the foil sheet. The weight ratios of lithium and aluminum foils also will affect the rate of formation of the alloy. In general, lithium-rich alloys form more rapidly than the aluminum-rich alloys.

In order to give those skilled in the art a better understanding, the following example is given:

EXAMPLE

A lithium foil 1 × 1 × 0.01 inches thick was pressed into a 1 × 1 inches galvanized iron mesh and, thereafter, a perforated aluminum foil of 1 × 2 inches dimension was laminated to the lithium foil by pressing such as to cover both sides of lithium. For the purpose of exemplifying the invention, the laminated lithium-aluminum foil was incorporated as one electrode in a cell having a reference lithium electrode and a pressed fiber polypropylene separator therebetween. Thereafter a 2.5 molar LiClO$_4$ solution in dioxolane was added to the cell, contacting the aluminum-lithium laminate. Thereafter, the open circuit voltage of the laminated electrode vs. the lithium reference electrode was measured. A change in open circuit voltage was indicative of alloy formation.

The procedure outlined hereinabove was repeated numerous times using various weight ratios of lithium and aluminum. The open circuit voltages of lithium-aluminum alloy electrodes are given in Table 1 (Column A) below. Also given in Table 1 (Column B) below for comparative purposes is the open circuit voltage of thermally formed lithium-aluminum alloy electrodes vs. lithium reference electrodes.

Table 1

Open Circuit Voltage of LiAl Alloy Electrodes Formed Using Porous Aluminum Laminated Lithium Electrodes
(Electrolyte 2.5 M LiClO$_4$ Dioxolane)

| Composition | | Open Circuit Voltge vs Li Ref. | |
|---|---|---|---|
| Li W/O | Al W/O | Column A Al Laminate of Li | Column B Thermally Formed Alloys |
| 94.3 | 5.7 | 0.001 | 0.000 |
| 89.2 | 9.8 | 0.001 | 0.000 |
| 80.4 | 19.6 | 0.001 | 0.000 |
| 19.3 | 80.7 | 0.413 | 0.385 |
| 11.2 | 88.8 | 0.414 | 0.440 |

As can be seen from the foregoing, the lithium-aluminum alloys prepared in accordance with the method disclosed herein have substantially the same open circuit voltages as those prepared by prior art thermal techniques. Indeed, the lithium-aluminum alloy electrodes prepared by the present invention are particularly useful anodes in electrochemical cells having electrolytes comprising nonaqueous organic solvents and lithium salts dissolved therein.

I claim:

1. A method of making a lithium-aluminum alloy electrode comprising:
   a. forming a laminate having at least one ply of aluminum sheet material and one ply of lithium sheet material;
   b. contacting the laminate with a solution of a lithium salt dissolved in an organic solvent for a time sufficient for alloy formation to occur.

2. The method of claim 1 wherein said laminate has two plies of aluminum enclosing one ply of lithium.

3. The method of claim 2 wherein the laminate is supported on a metal mesh support structure.

4. The method of claim 3 wherein the weight ratio of aluminum to lithium is in the range of 10% to 95% by weight.

5. The method of claim 4 wherein the weight ratio of aluminum to lithium is in the range of 20% to 80% by weight.

6. The method of claim 4 wherein the concentration of lithium salt dissolved in an organic solvent is in the range of from about 1 to 3 molar.

7. The method of claim 6 wherein the solution of the salt is lithium perchlorate dissolved in dioxolane.

8. The method of claim 7 wherein the concentration of lithium perchlorate in dioxolane is in the range of from about 2.5 to 3 molar.

9. The method of forming a lithium-aluminum alloy electrode comprising:
   pressing a sheet of lithium metal onto a metal mesh support structure;
   pressing aluminum sheet material on each major surface of said lithium pressed on said wire mesh, thereby forming a laminated structure, said aluminum sheet material being perforated, the weight ratio of aluminum sheet material to lithium sheet material being in the range of from about 10% to about 95% by weight;

contacting said laminated structure with a nonaqueous organic solution of a lithium salt for a time sufficient for alloy formation to occur.

10. The method of claim 9 wherein the weight ratio of aluminum to lithium sheet material is in the range from about 20% to about 80% by weight.

11. The method of claim 10 wherein the perforations in said aluminum sheet comprise greater than 35% of the total area of said aluminum sheet.

12. The method of claim 11 wherein the concentration of lithium salt solution is between about 1.0 and 3.0 molar.

13. The method of claim 12 wherein the lithium salt is lithium perchlorate and wherein the nonaqueous organic solvent is dioxolane.

* * * * *